United States Patent [19]

Creed et al.

[11] Patent Number: 4,936,072
[45] Date of Patent: Jun. 26, 1990

[54] CONTAINER FILLER AND SEALER WITH TWO DIRECTIONAL FLEXING CHAIN

[75] Inventors: Sherman H. Creed; Krishna R. Kumandan; Dennis E. Schramm, all of Fresno, Calif.

[73] Assignee: FMC Corporation, Chicago, Ill.

[21] Appl. No.: 261,670

[22] Filed: Oct. 24, 1988

[51] Int. Cl.⁵ ............................................. B65B 43/52
[52] U.S. Cl. ........................................ 53/282; 53/249; 198/339.1; 198/803.14
[58] Field of Search ............... 53/282, 281, 272, 271, 53/249; 141/134, 131, 145, 144; 198/570, 339.1, 803.14

[56] References Cited

U.S. PATENT DOCUMENTS

| | | | |
|---|---|---|---|
| 1,651,925 | 12/1927 | Marsh | 198/803.14 X |
| 3,331,183 | 7/1967 | Gass | 53/282 X |
| 3,336,722 | 8/1967 | Van der Winden | 53/282 X |
| 3,847,272 | 11/1974 | Anikanov et al. | 198/803.14 X |
| 4,467,847 | 8/1984 | Zodrow | 198/570 X |

OTHER PUBLICATIONS

Rexnord Catalog (p. 81 and two additional numbered pages) (no date).

Primary Examiner—James F. Coan
Attorney, Agent, or Firm—A. J. Moore; R. C. Kamp; R. B. Megley

[57] ABSTRACT

A filler and sealer with an endless two directional flexing chain having carriers thereon are capable of being driven about vertical axes of a rotary filler and also about horizontal axes of end discs. Each carrier movably supports a tray supporting head which is accurately maintained in filling positions relative to rotary and reciprocating tray fillers, and is thereafter accurately maintained in position to have a lid sealed on the container. Arcuate guide shoes on each carrier ride in linear and arcuate tracks to guide the carriers. A push bar conveyor includes spacer rollers which engage each carrier and push the carriers around their paths of movement at uniform speed.

19 Claims, 6 Drawing Sheets

FIG_1

FIG_2

FIG_3

FIG_4

FIG_6

FIG_7

FIG_8

FIG_9

4,936,072

CONTAINER FILLER AND SEALER WITH TWO DIRECTIONAL FLEXING CHAIN

BACKGROUND OF THE INVENTION

1. Field of the Invention

The present invention relates to container filling and sealing apparatus and more particularly relates to such apparatus which uses a pair of container supporting, two directional endless flexing chains which are capable of pivoting about vertical axes when passing through offset rotary fillers thereby gaining additional filling engagement time, and also pivotal about horizontal axes of the chains for movement about head shaft wheels thereby reducing floor space by minimizing the width between the two endless container supporting chains. Since the two directional flexing chains are inherently difficult to align with their sealing heads, the containers (hereinafter referred to as trays), are supported on tray supporting heads which are resiliently supported on and resiliently attached to carriers of the flexing chains. Tray engaging positioning devices supported by the sealers and lid dispensers accurately register the trays with the sealers to assure that the product is properly sealed in the trays. To minimize the effect of what is known as cordal action due to excessively long pitched chains, the tray supporting chains are pulled by secondary cross roller chains. The cross roller chains engage portions of bi-directional chain links

SUMMARY OF THE PRESENT INVENTION

The apparatus of the present invention includes at least, one two directional flexing chain, having a plurality of pivotally interconnected carriers adapted to pivot about pairs of axes normal to each other, with each carrier resiliently attached to a tray supporting head which is centered with the associated sealing head by tray centering means supported on a reciprocating sealer and lid dispenser for accurately aligning the head and tray with the associated reciprocating sealer and lid dispenser.

DESCRIPTION OF THE PREFERRED EMBODIMENT

Figure 1:
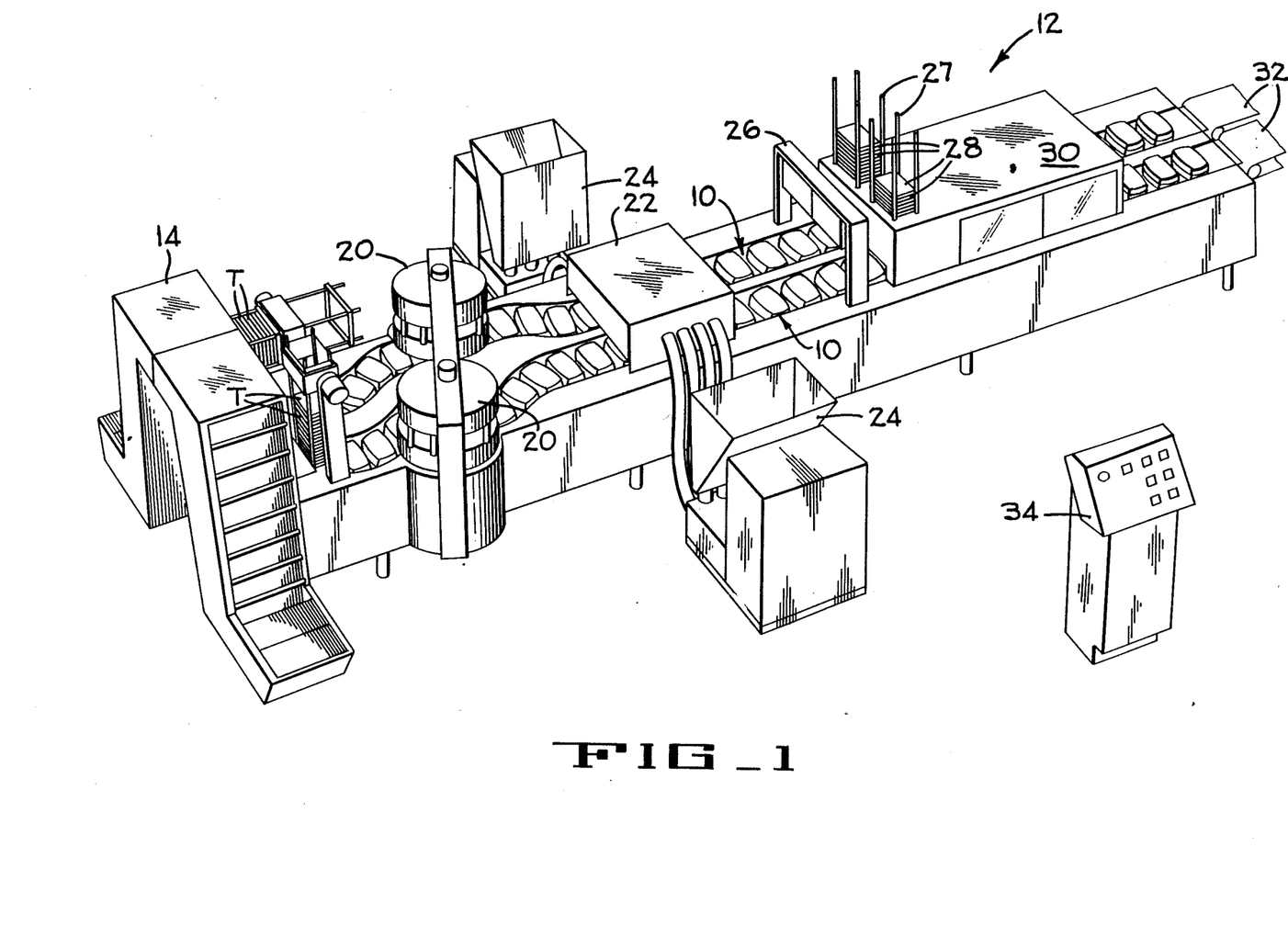
FIG. 1 is a perspective of a container filling and sealing apparatus illustrating a pair of closely spaced, two directional endless flexing chains passing through two offset rotary fillers and other components of the apparatus.
Figure 2:
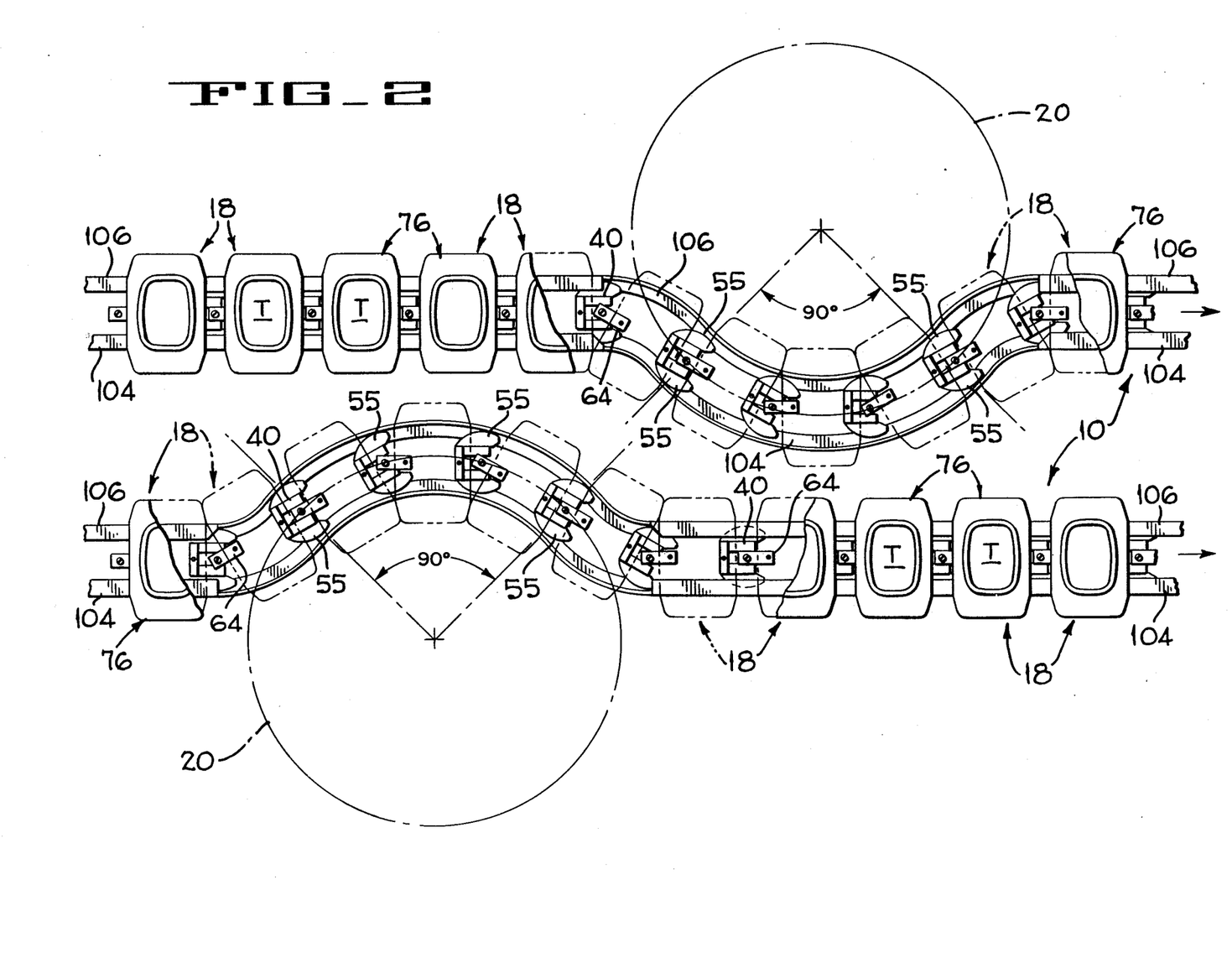
FIG. 2 is an enlarged plan view illustrating portions of the two chains being flexed through angles of at least 90° while being filled by the offset rotary fillers.

The two directional flexing chains 10 (FIG. 1) of the present invention are used in a container filler and sealer 12. The filler and sealer may be of the type which includes a container feeder 14 which is illustrated as receiving trays T and then loading the trays into the carriers 18 of the flexing chains 10. The upper runs of the flexing chains are driven to the right (FIG. 1) under conventional rotary granular fillers 20 which discharge granular material such as food products or the like into the trays T while the trays are flexing horizontally and are moving through about a 90° arc as illustrated in FIG. 2 at which time the trays receive the granular product. The partially filled trays then move below a conventional longitudinally reciprocating piston type liquid filler 22 which receives flowable material from hoppers 24 and discharges liquids in the form of sauces, and/or other flowable material into the partially filled trays T. The filled trays are then moved past an inspection station 26 which, by vision systems or other means, inspects the sealing surfaces of the trays for contamination by food products (or other products) filled into the trays. The trays are then advanced under a conventional lid dispenser 27 which deposits lids 28 on those trays which pass inspection; and thereafter, conventional heat sealers within a housing 30 hermetically seal the lids onto the trays T for subsequent discharge onto take-away conveyors 32. The several components of the container filler and sealer 12 are controlled by conventional controls from an operator station 34.

The fillers 20 may be used to fill granular products such as chunks of vegetables and meat in appropriate sauces to provide dinners. If large pieces of chicken, fillet of fish or the like are to be placed in the trays, areas are provided on the apparatus for manual placement of such items in the trays.

Figure 3:
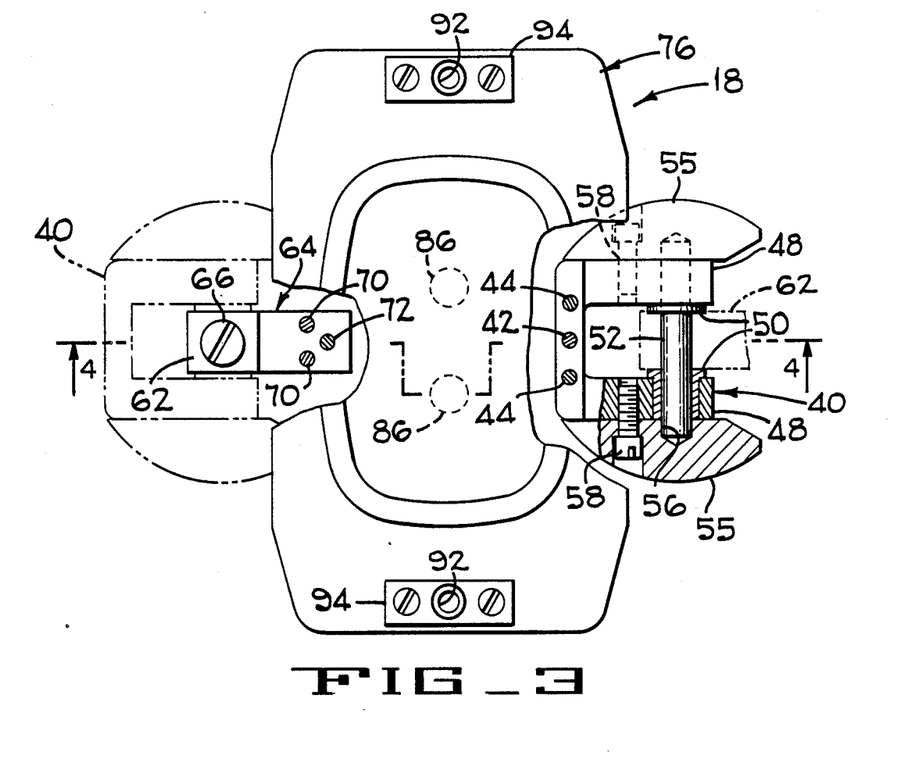
FIG. 3 is an enlarged plan view of one of the carriers, certain parts being cut away and others being shown in phantom lines.
Figure 4:
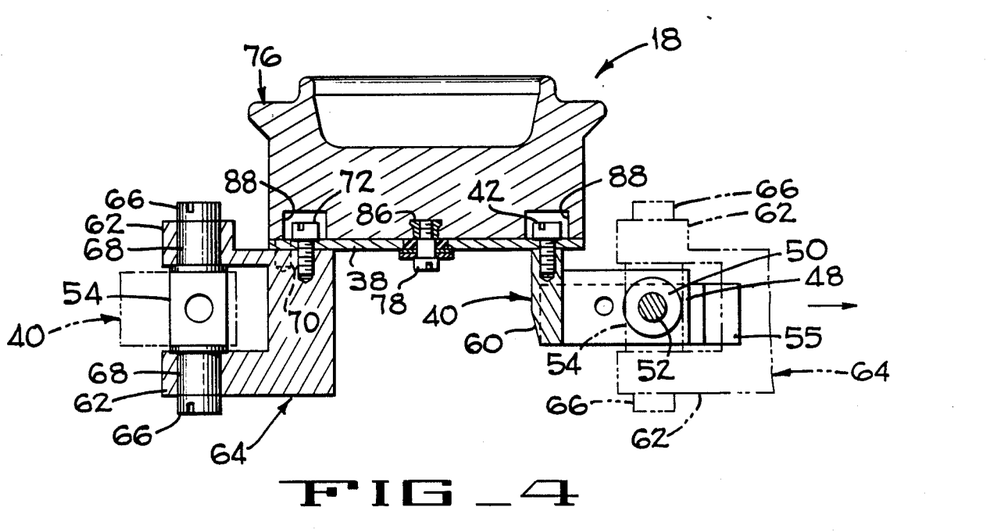
FIG. 4 is a section taken along lines 4—4 of FIG. 3 illustrating a tray receiving head resiliently connected to the carrier.
Figure 5:
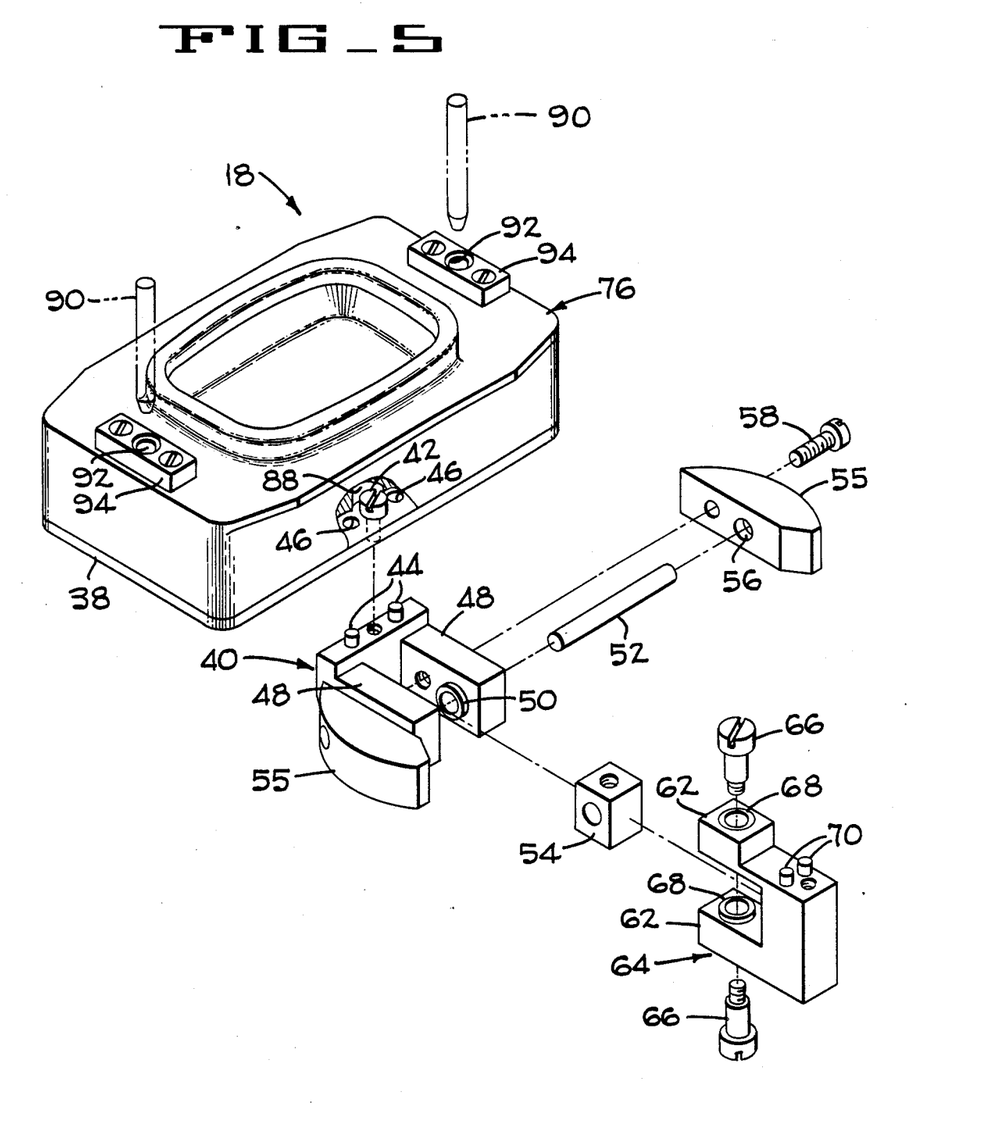
FIG. 5 is an exploded perspective of the components of one of the carriers, and further illustrate in phantom lines one of a plurality of pairs of vertically movable pin alignment devices supported by the associated sealing head for accurately aligning the adjustable container supporting head with an associated component on the sealing head during the sealing operation.

Having reference to FIGS. 3-5, each carrier 18 comprises a mounting plate 38 which is rigidly secured to a horizontally oriented clevis 40 that is rigidly secured to the leading end of the mounting plate 38 by a capscrew 42 and a pair of pins 44 projecting upwardly through holes 46 in the plate 38. Spaced legs 48 of the clevis 40 are bored to receive bushings 50 (FIGS. 3 and 5). A horizontal pivot pin 52 extends through the bushings 50 and a hole (FIG. 5) in a pivot block 54 of the next forward carrier. A pair of arcuate carrier guide shoes 55 have counter sunk holes 56 therein which prevent axial movement of the horizontal pin 52. The arcuate guide shoes 55 are drilled to receive capscrews 58 which are threaded into the clevis legs 48 thereby rigidly securing the guide shoes to the clevis 40. As illustrated in FIG. 4, a bevel surface 60 on the horizontal clevis 40 is provided to receive drive means to be described hereinafter.

The pivot block 54 (FIG. 5) is received between spaced legs 62 of a vertically oriented clevis 64 that is rigidly connected to the mounting plate 38 of the next forward carrier 18. A pair of shouldered capscrews 66 are rotatably received in bushings 68 in the clevis legs and are screwed in the block 54 to provide vertical and horizontal pivotable movement between the adjacent carriers 18. As shown in FIGS. 4 and 5, a pair of vertical pins 70 are fitted in holes in the associated plate 38, and a capscrew 72 (FIG. 4) rigidly secures each vertical clevis 64 to the associated plate 38.

Having reference to FIG. 2, it will be noted that as the carriers 18 move about the vertical axes of the associated fillers 20, their directions of movement are not truly arcuate but are cords of an arc in nature. This cordal driving action if not compensated for, prevents the fillers from moving at a constant speed but instead causes each filler to alternately speed up and slow down as they move through the associated filling and sealing apparatus.

The previously described arcuate guide shoes 55 (FIG. 3) engage sprockets (not shown) on the rotary fillers 20 which drive the fillers at the same speed as the flexing chains 10. Separate chain drive means to be described later, are provided for driving the conveyors 10 which will eliminate the objectionable cordal action and result in maintaining the carriers 18 and trays T therein in position to receive the granular material from the granular fillers 20 without spilling.

Due to practical producability problems with the two directional flexing chain 10, the pitch of the carriers 18 and supported trays T varies slightly. This problem is corrected by resilient support and positioning devices (not shown) in the lid dispenser 27 (FIG. 1) and the conventional heat sealers within housing 30.

Complete correction of the producability problem is solved by mounting each tray supporting head 76 on the associated mounting plate 38 by a pair of shouldered bolts 78 (FIG. 4). The bolt 78 is screwed into, and shouldered against, a stainless steel captive nut 86 which is secured within the base of the associated tray supporting head 76. It will be noted that the capscrews 42,72 are received within cavities 88 in the head 76 thus permitting movement of the heads 76 relative to the conveyor plate 38.

In order to accurately lock each tray supporting head 76 (FIG. 5) in precise position relative to the reciprocating sealer head (not shown) within the housing 30 (FIG. 1), a pair of tray locking pins 90 having frusto-conical lower ends are positioned to enter alignment holes 92 in blocks 94 bolted to the upper surface of the tray supporting head 76.

The locking pins 90 are mounted on the reciprocating filler 22 and the sealers (not shown) within the housing 30. The pins 90 enter alignment holes 92 on the tray supporting heads 76. This permits precise and accurate alignment with the trays during filling and sealing which is not reliable otherwise because of problems such as stack-up of tolerances and dynamic problems of over-shooting as far as back lash would allow.

Figure 9:
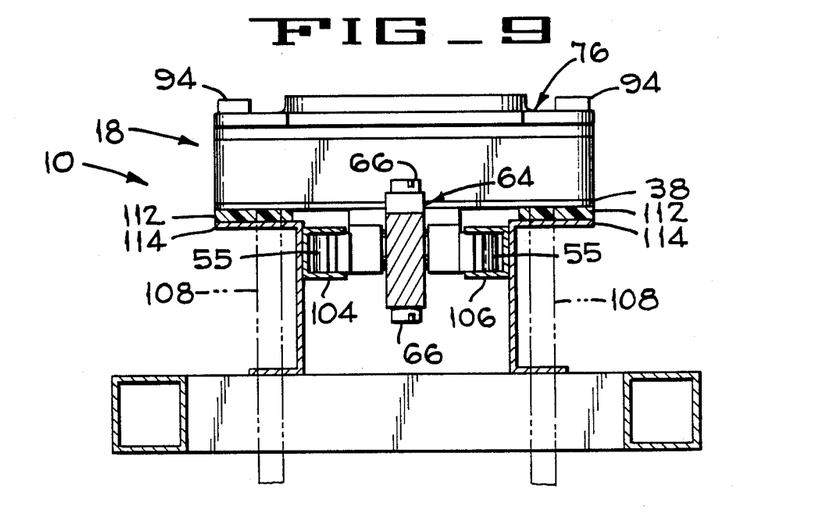
FIG. 9 is a vertical section taken through the upper run of one of the flexing chains illustrating the frame structure for supporting the upper run of the flexing chain including channel carrier guides and further illustrating in phantom lines the transverse position of the rear end wheels.

Each two directional flexing chain 10 is an endless chain and is guided throughout a major portion of its run by a pair of channel guide tracks 104 and 106 (FIGS. 2 and 9) which slidably engage the arcuate guide shoes 55. Certain portions of the tracks are in the form of channels and other portions are in the form of angles. In addition, the end portions of the chains 10 are trained around pairs of spaced discs 108 keyed to idler shafts 110 (FIG. 7), only portions of one of the pair of discs 108 at the discharge end of one flexing chain 10 being shown in FIGS. 7 and 9. It will be noted that the lower surface of the carrier mounting plate 38 of each carrier 76 slides along a pair of low friction plastic strips 112 which are secured to frame members 114.

Figure 6:
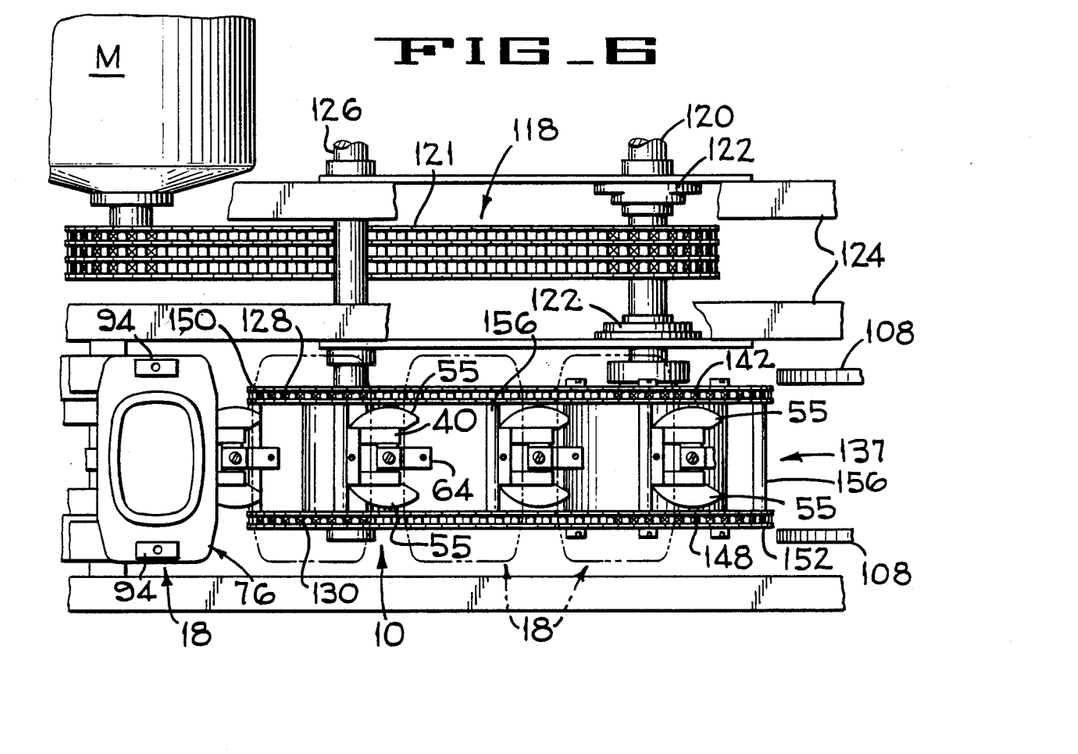
FIG. 6 is a plan view of the downstream end portion of one of the two directional flexing chains illustrating the means for driving one of the endless flexing chains.
Figure 7:
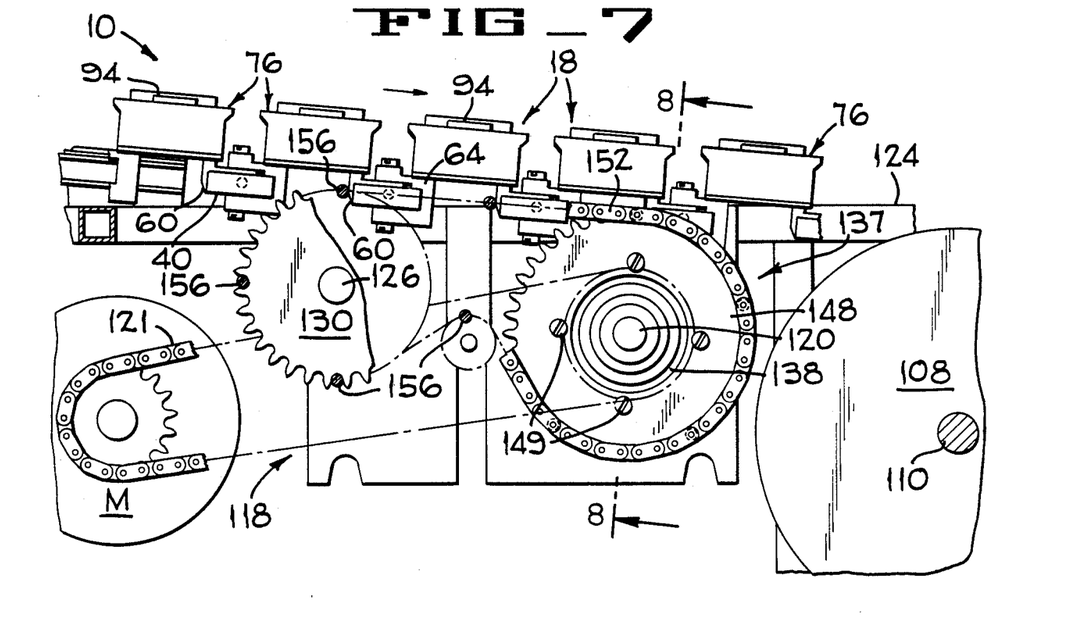
FIG. 7 is an elevation of FIG. 6 illustrating additional components of the flex chain drive including a portion of one of a pair of end discs around which one end of the endless flexing chain is trained.
Figure 8:
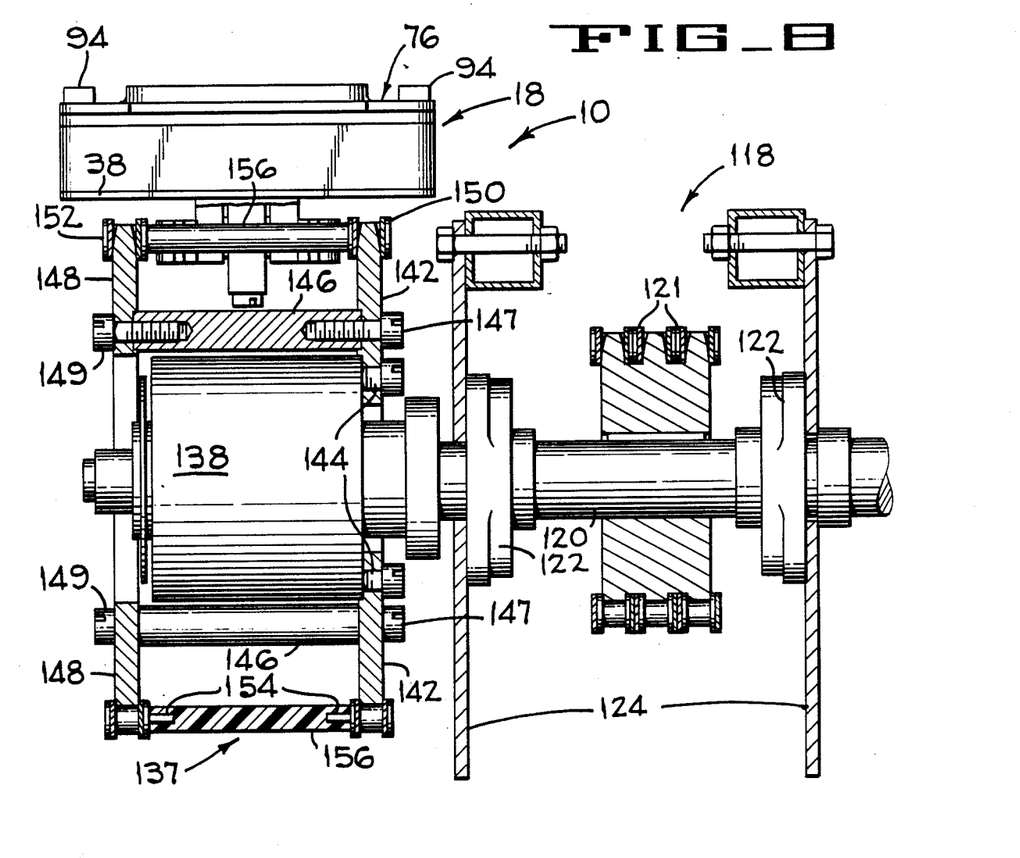
FIG. 8 is a section taken substantially along lines 8—8 of FIG. 7.

FIGS. 6, 7 and 8 illustrate a unique drive system 118 for each flexible chain 10, only the drive for one chain being shown.

A motor M is coupled to a drive shaft 120 by a triple chain drive 121. The shaft 120 is journaled in bearings 122 supported on frame members 124. An idler shaft 126 is journaled on the frame 124 and has a pair of idler sprockets 128,130 keyed thereto. The idler sprockets 128,130 form a portion of a unique cross roller chain drive 137 (FIGS. 6-8).

The cross roller drive 137 is used to drive the associated flexing chain 10, and includes a pneumatically operable servo clutch (not shown) which permits fine tuning different settings of starting and running torque. The servo clutch also permits driving either conveyor alone, and also adjust the two conveyors to be sure that both conveyors are in time when both lanes are running. However, for purposes of the present invention the specific details of the servo clutch have not been illustrated and is illustrated herein as a drum 138 (FIG. 8). The drum is keyed to an extension of shaft 120 and has a first annular sprocket 142 secured thereto by a plurality of capscrews 144 and disposed in planar alignment with sprocket 128. A plurality of spacer rods 146 are bolted to the annular sprocket 142 by capscrews 147 and have a second annular sprocket 148 bolted thereto by capscrews 149 in planar alignment with the sprocket 130 on shaft 126. A pair of endless chains 150,152 are trained over sprocket 128,142 and sprockets 130,148, respectively. Each chain 150,152 has a plurality of evenly spaced elongated pins 154 thereon which rotatably receive cylindrical conveyor push rollers 156 thereon. As best shown in FIG. 7, the push rollers 156 engage the previously mentioned beveled surfaces 60 on the associated horizontal clevis 40 of the carriers thereby driving the carriers in the direction of the arrows in FIGS. 4 and 7.

It will be understood that the second of the two directional flexing chain conveyor 10 is connected to the shafts 120,126 (FIG. 6), is driven by the motor M and triple chain 121 and is substantially a mirror image of the above described conveyor drive system 118.

From the foregoing description it will be apparent that the two directional flexing chain conveyors of the present invention, when used in conjunction with a container filling and sealing apparatus, provides an improved conveying system which includes pivotally interconnected carriers which receive containers or trays from a tray feeder, curve about a vertical axis while receiving granular material from a rotary filler, move linearly below a liquid filler to receive liquids such as sauces or the like, move through an inspection station, and then through a lid dispenser and heat sealer to provide hermetically sealed containers filled with commodities such as food products. The carriers thereafter deflect about horizontal axes to repeat the above process. Since the movement of large pitch conveyors is subjected to cordal action resulting in non-uniform speeds, apparatus is provided to positively drive the carriers at uniform speed in alignment with the sealers during the sealing operation, and tracks are provided to guide each tray along a predetermined path.

Although the best mode contemplated for carrying out the present invention has been herein shown and described, it will be apparent that modification and variation may be made without departing from what is regarded to be the subject matter of the invention.

What is claimed is:

1. In an elongated container filling and sealing apparatus, the improvement which comprises:
   an elongated generally rectangular frame;
   two pair of conveyor guide tracks mounted on said frame, each pair of guide tracks having two arcuate end portion generated about horizontal axes and an arcuate intermediate portion generated about a vertical axis;
   a pair of endless flexing conveyors movably supported in associated ones of said conveyor drive tracks;
   each endless flexing conveyor including a plurality of carriers interconnected to each other for pivotal movement about said horizontal and associated ones of said vertical axes; and
   conveyor drive means disposed intermediate said arcuate portions for engaging said carriers for driving said carriers of said flexing conveyors through said arcuate end portions and arcuate intermediate portions of said conveyor drive tracks.

2. An apparatus according to claim 1 wherein each of said carriers includes arcuate guide means slidably received in the associated guide tracks.

3. An apparatus according to claim 1 and additionally comprising two rotary filling means concentric with associated ones of said vertical axes for filling produce into containers supported on said carriers, said vertical axes being offset from each other longitudinally of said frame for minimizing the transverse spacing between said endless flexing conveyors.

4. An endless flexing conveyor comprising:
   means defining a plurality of carriers;
   means for interconnecting said carriers for selective pivotal movement about axes normal to each other;
   means for guiding said carriers along a predetermined path;
   means for driving said endless flexing conveyor along said predetermined path;
   said carriers being horizontally oriented and being adapted to receive containers, wherein a third axis is a vertical axis of a driven rotary filler, and wherein the containers remain in position to receive granular products from said rotary filler; and
   an adjustable container supporting head included in each carrier means;
   resilient means interconnecting said container supporting head to said associated carrier means; and
   alignment means partially carried on said rotary filler accurately aligning said container supporting head with said rotary filler while moving about said vertical filler axis.

5. An apparatus according to claim 4 wherein said alignment means includes a pair of apertures on each of said container supporting heads, an associated pair of pins for each head carried by said rotary filler; and power means on said rotary filler for moving said pins into said apertures of said associated head for maintaining exact alignment of said head with said rotary filler while said container supporting head is moving about said vertical filler axis.

6. An endless flexing conveyor comprising:
   means defining a plurality of carriers;
   means for interconnecting said carriers for selective pivotal movement about axes normal to each other;
   means for guiding said carriers along a predetermined path;
   means for driving said endless flexing conveyor along said predetermined path;
   said carriers being horizontally oriented and being adapted to receive containers, wherein a third axis is a vertical axis of a driven rotary filler, and wherein the containers remain in position to receive granular products from said rotary filler; and
   arcuate guide shoes connected to each of said interconnecting means and being generated about an associated one of said normal axes which is vertically oriented, and arcuate guide means for guiding said shoes along a portion of said arcuate path.

7. An apparatus according to claim 6 and additionally comprising means defining a reciprocating lid dispenser and sealer, an adjustable container supporting head included in each carrier means, resilient means interconnecting said container supporting head to said associated carrier means, and alignment means partially carried by said lid dispenser and sealer for accurately aligning said container supporting head with said reciprocating lid dispenser and sealer prior to sealing the lid on the container.

8. An apparatus according to claim 7 wherein said alignment means includes a pair of apertures on each of said container supporting heads, and associated pairs of pins for each head carried by said reciprocating lid dispenser and sealer; and means on said lid dispenser and sealer for moving said pins into said apertures of said associated heads for maintaining exact alignment of said heads with said lid dispenser and said sealer.

9. An endless flexing conveyor comprising:
   means defining a plurality of carriers;
   means for interconnecting said carriers for selective pivotal movement about axes normal to each other;
   means for guiding said carriers along a predetermined path;
   means for driving said endless conveyor along said predetermined path; wherein each carrier means includes a mounting plate, a vertical clevis rigidly secured to one end of said mounting plate, a horizontal clevis rigidly secured to the other end of said mounting plate and having a conveyor drive surface, and a driven endless conveyor having pusher rollers spaced apart a distance substantially equal to the spacing of said driving surfaces for engaging and driving said flexing conveyor.

10. An apparatus according to claim 9 wherein said driving surface is a bevel surface for permitting the pusher rollers to smoothly engage said associated driving surfaces.

11. An apparatus according to claim 10 wherein each of said pusher rollers are rotatably supported on said driven endless conveyor.

12. A container filling and sealing apparatus which includes at least one element that is rotatable about a vertical axis, the improvement which comprises:
    means defining a two directional flexing conveyor having a plurality of carriers movable about vertical and horizontal axes;
    means defining a pair of guide tracks for guiding said flexing conveyors along a predetermined path;
    power means for driving said two directional flexing conveyor; and a pair of arcuate guide shoes on each of said carriers slidably received in said guide tracks for guiding said carriers along linear paths and also around arcuate paths that are generated about horizontal and vertical axes.

13. A container filling and sealing apparatus which includes at least one element that is rotatable about a vertical axis, the improvement which comprises:
- means defining a two directional flexing conveyor having a plurality of carriers movable about vertical and horizontal axes;
- means defining a pair of guide tracks for guiding said flexing conveyor along a predetermined path;
- power means for driving said two directional flexing conveyor;
- a rotary filling head;
- a container supporting head included on each carrier, means resiliently connecting said container supporting head to said associated carrier, and
- alignment means partially supported by said rotary filling head for accurately aligning said container supporting head with said rotary filling head while moving arcuately around the vertical axis of said rotary filling head.

14. An apparatus according to claim 13 wherein each carrier means includes a mounting plate, a vertical clevis rigidly secured to one end of said mounting plate, a horizontal clevis rigidly secured to the other of said mounting plate and having a conveyor driving surface, and a driven endless conveyor having pusher rollers spaced apart a distance substantially equal to the spacing of said driving surfaces for engaging and driving said flexing conveyor at a predetermined speed.

15. An apparatus according to claim 14 wherein said driving surface is a beveled surface for permitting the pusher bars to smoothly engage said associated driving surfaces.

16. An apparatus according to claim 15 wherein said pusher rollers are rotatably received on said driven endless pusher rollers conveyor.

17. In an elongated container filling and sealing apparatus, the improvement which comprises:
- an elongated generally rectangular frame;
- a pair of conveyor guide tracks mounted on said frame, said pair of guide tracks having two arcuate end portions generated about horizontal axes and an arcuate intermediate portion generated about a vertical axis;
- an endless flexing conveyors movably supported in said conveyor drive tracks;
- said endless flexing conveyor including a plurality of carriers interconnected to each other for pivotal movement about said horizontal and vertical axes; and
- conveyor drive means disposed intermediate said arcuate portions for engaging said carriers for driving said carriers of said flexing conveyor through said arcuate end portions and arcuate intermediate portions of said conveyor drive tracks.

18. An apparatus according to claim 17 wherein each of said carriers includes arcuate guide means slidably received in the associated guide tracks.

19. An apparatus according to claim 17 and additionally comprising a rotary filler means concentric with said vertical axis for filling produce into containers supported on said carriers.

* * * * *